(12) United States Patent
Bucher et al.

(10) Patent No.: US 12,514,140 B2
(45) Date of Patent: Jan. 6, 2026

(54) SMART IMPLEMENTS

(71) Applicant: Agtonomy, South San Francisco, CA (US)

(72) Inventors: Timothy Bucher, Geyserville, CA (US); Steven Holmes, Redwood City, CA (US)

(73) Assignee: AGTONOMY, South San Francisco, CA (US)

( * ) Notice: Subject to any disclaimer, the term of this patent is extended or adjusted under 35 U.S.C. 154(b) by 320 days.

(21) Appl. No.: 17/647,731

(22) Filed: Jan. 11, 2022

(65) Prior Publication Data

US 2022/0217892 A1     Jul. 14, 2022

Related U.S. Application Data

(60) Provisional application No. 63/208,388, filed on Jun. 8, 2021, provisional application No. 63/136,197, filed on Jan. 11, 2021.

(51) Int. Cl.
| | | |
|---|---|---|
| *A01B 59/00* | (2006.01) | |
| *A01B 59/06* | (2006.01) | |
| *A01B 71/06* | (2006.01) | |
| *A01B 79/00* | (2006.01) | |
| *A01D 34/00* | (2006.01) | |
| *A01D 69/00* | (2006.01) | |
| *A01D 101/00* | (2006.01) | |

(Continued)

(52) U.S. Cl.
CPC .............. *A01B 59/06* (2013.01); *A01B 71/06* (2013.01); *A01B 79/005* (2013.01); *A01D 34/006* (2013.01); *A01D 69/002* (2013.01); *A01M 7/0089* (2013.01); *A01D 2101/00* (2013.01)

(58) Field of Classification Search
CPC ....... A01B 59/06; A01B 71/06; A01B 79/005; A01B 59/00; A01D 34/006; A01D 69/002; A01D 2101/00; A01M 7/0089; B60W 30/188; B60Y 2200/221
USPC .......................................................... 701/50
See application file for complete search history.

(56) References Cited

U.S. PATENT DOCUMENTS

| | | |
|---|---|---|
| 4,956,561 A | 9/1990 | Tamer |
| 5,863,057 A | 1/1999 | Wessels |
| (Continued) | | |

FOREIGN PATENT DOCUMENTS

| | | |
|---|---|---|
| JP | 2016-067244 A | 5/2016 |
| JP | 2018-161085 A | 10/2018 |
| JP | 2019-041729 A | 3/2019 |

OTHER PUBLICATIONS

Cha et al., WO 2020222400 A2 Method for Controlling Electricity Generation in Agricultural Electric Vehicle, Jan. 15, 2020 (Year: 2021).*

(Continued)

*Primary Examiner* — Adam R Mott
*Assistant Examiner* — Heather J Keniry
(74) *Attorney, Agent, or Firm* — Maschoff Brennan

(57) ABSTRACT

An example smart implement includes a power takeoff connector, one or more sensors, a controller, and a communication unit. The power takeoff connector attaches the smart implement to a tractor. The one or more sensors generate implement data. The controller is configured to determine operating parameters based on the implement data from the one or more sensors. The communication unit is configured to communicate with the tractor.

20 Claims, 5 Drawing Sheets

Sprayer

Mower

Weeder (51) Int. Cl.
   *A01M 7/00* (2006.01)
   *B60W 30/188* (2012.01)

(56) References Cited

U.S. PATENT DOCUMENTS

| | | | | |
|---|---|---|---|---|
| 6,804,597 | B1* | 10/2004 | Posselius | A01B 79/005 |
| | | | | 701/50 |
| 7,062,389 | B2* | 6/2006 | Johnson | G06Q 50/06 |
| | | | | 705/412 |
| 8,295,950 | B1 | 10/2012 | Wordsworth et al. | |
| 9,251,627 | B2 | 2/2016 | Carl | |
| 10,802,471 | B2 | 10/2020 | Saito et al. | |
| 11,582,903 | B1* | 2/2023 | Brown | B60W 40/02 |
| 11,927,968 | B2* | 3/2024 | Krog | G05D 1/661 |
| 2008/0024451 | A1 | 1/2008 | Aimi et al. | |
| 2008/0257570 | A1* | 10/2008 | Keplinger | A01B 63/145 |
| | | | | 172/7 |
| 2010/0102625 | A1 | 4/2010 | Karimi et al. | |
| 2011/0204712 | A1* | 8/2011 | Tarasinski | A01B 59/06 |
| | | | | 307/9.1 |
| 2013/0173123 | A1 | 7/2013 | Douchida et al. | |
| 2013/0197767 | A1* | 8/2013 | Lenz | A01B 79/005 |
| | | | | 701/50 |
| 2017/0032258 | A1 | 2/2017 | Miresmailli et al. | |
| 2017/0374323 | A1 | 12/2017 | Gornik | |
| 2018/0126986 | A1 | 5/2018 | Kim et al. | |
| 2018/0317388 | A1* | 11/2018 | Gresch | A01D 41/1274 |
| 2018/0370365 | A1 | 12/2018 | Lee et al. | |
| 2019/0281755 | A1* | 9/2019 | Heckeroth | A01B 59/061 |
| 2021/0105940 | A1* | 4/2021 | Hodson | A01D 41/141 |
| 2022/0338404 | A1* | 10/2022 | Tanaka | A01B 63/12 |

OTHER PUBLICATIONS

Daniel Oberhaus, "The Batteries of the Future are Weightless and Invisible", Nov. 6, 2020, retrieved from <URL: https://www.wired.com/story/the-batteries-of-the-future-are-weightless-and-invisible/>.

PCT International Search Report and Written Opinion issued in corresponding application No. PCT/US2022/012059, dated Mar. 29, 2022.

PCT International Search Report and Written Opinion issued in corresponding application No. PCT/US2022/012057, dated Apr. 1, 2022.

International Search Report and Written Opinion issued in corresponding application No. PCT/US2022/012058, dated Apr. 11, 2022.

JP Office Action dated Jun. 18, 2024 as received in Application No. 2023-542554.

* cited by examiner

SMART IMPLEMENTS

RELATED APPLICATIONS

The present application claims priority to U.S. Provisional Patent Application No. 63/136,197, filed on Jan. 11, 2021 and U.S. Provisional Patent Application No. 63/208,388, filed on Jun. 8, 2021. The entire contents of each of which are incorporated by reference in the present disclosure.

FIELD

The present disclosure is generally directed towards smart implements.

BACKGROUND

Unless otherwise indicated herein, the materials described herein are not prior art to the claims in the present application and are not admitted to be prior art by inclusion in this section.

Farming and agricultural ventures are often associated with labor intensive work and long hours. In some circumstances, long hours may be attributed to the large tracts of land and numerous crops that may be included in an operation. In some instances, tractors and other large machinery are used in conjunction with attached implements to manage the tracts of land. Some implements may consume large amounts of energy and/or time.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF SUMMARY

In an embodiment, a smart implement may include combinations of a power takeoff connector, one or more sensors, a controller, and a communication unit. The power takeoff connector attaches the smart implement to a tractor. The one or more sensors generate implement data. The controller is configured to determine operating parameters based on the implement data from the one or more sensors. The communication unit is configured to communicate with the tractor.

These and other aspects, features and advantages may become more fully apparent from the following brief description of the drawings, the drawings, the detailed description, and appended claims.

BRIEF DESCRIPTION OF THE DRAWINGS

Example embodiments will be described and explained with additional specificity and detail through the use of the accompanying drawings in which.

DESCRIPTION OF EMBODIMENTS

Agricultural undertakings, including farming, are often time consuming and of a large scale such that power vehicles and equipment provide a great benefit in accomplishing tasks related thereto. Tractors and other agricultural equipment may be used to help reduce the amount of time required to cultivate land and/or crops. In some circumstances, various implements may be attached to the tractors and other agricultural equipment that may be used to help accomplish tasks.

Implements simplify much of the agricultural process but also use a large amount of energy to operate. As the energy is provided by an associated tractor or other vehicle, use of implements may contribute to increased amounts of pollution and/or energy consumption of the tractor. Further, once connected and in operation, implements are often designed to run at or near 100% capacity until disconnected.

In some embodiments, a smart implement may include variable power consumption, as determined by the implement, or as directed by the associated tractor. In some circumstances, the smart implement may detect the surrounding environment or information related to the current task which may be used to direct the amount of power consumption by the smart implement.

In some embodiments of the present disclosure, a smart implement may reduce the amount of power requested from an associated tractor, such that the tractor may be more energy efficient. Further, the smart implement may improve the speed of which tasks are completed by increasing power consumption to complete the tasks as circumstances permit or dictate.

In the present disclosure, the term "tractor" may refer to an agricultural tractor and/or other power equipment or vehicles that may be used in an agricultural setting. Alternatively or additionally, the term "tractor" may include a power vehicle that may be configured to support and operate an implement, which may be used in the agricultural setting or any other applicable setting. Further, while discussed in primarily an agricultural setting, some embodiments of the present disclosure may be used in other settings, such as mining, construction, and/or other locales where large machinery may be beneficial.

Figure 1:
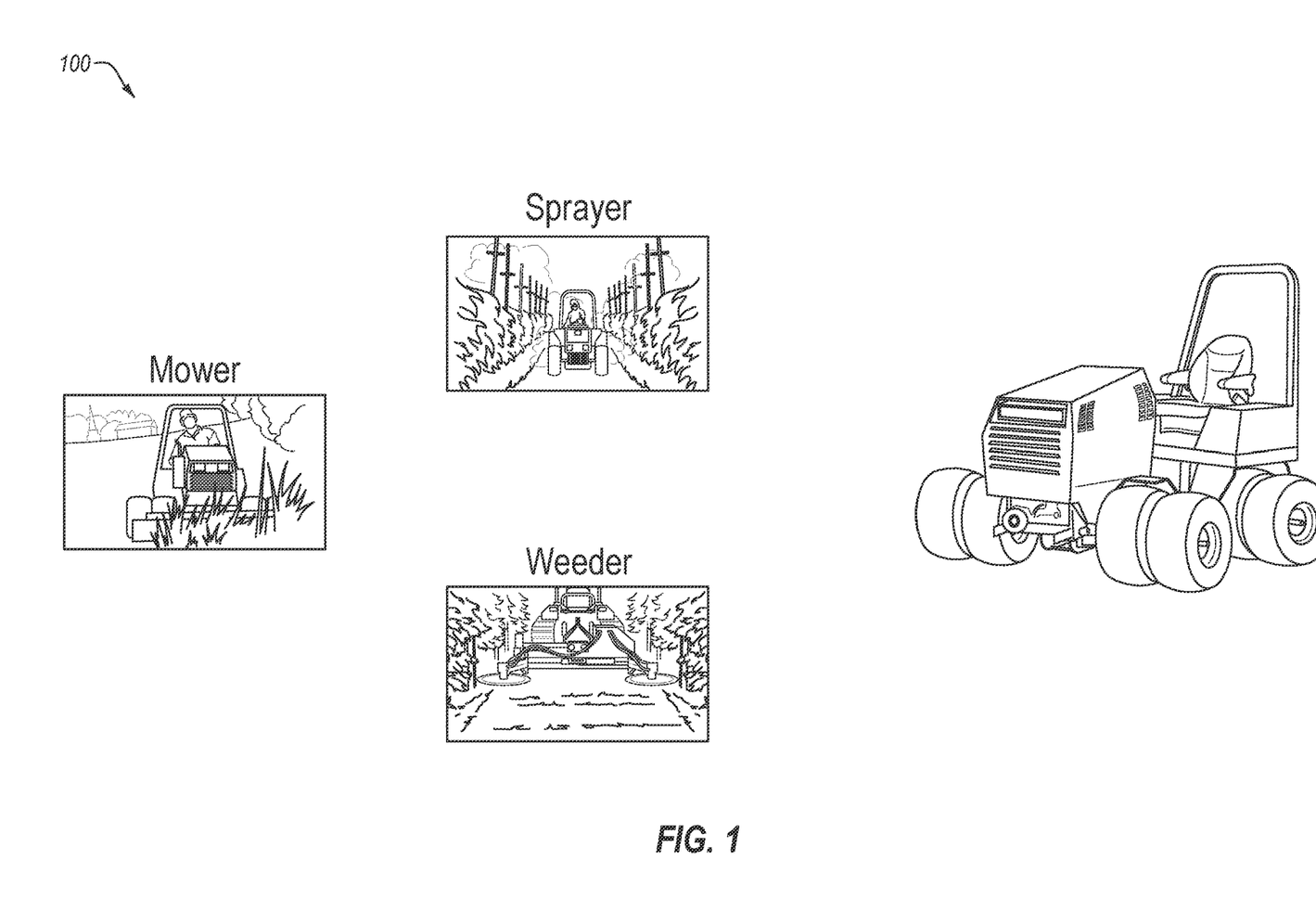
FIG. 1 illustrates a number of example smart implements.

FIG. 1 illustrates a number of example smart implements 100, in accordance with at least one embodiment described in the present disclosure. The example smart implements 100 may include some or all of the components as discussed in conjunction with FIG. 2, FIG. 3, and/or FIG. 4.

Figure 2:
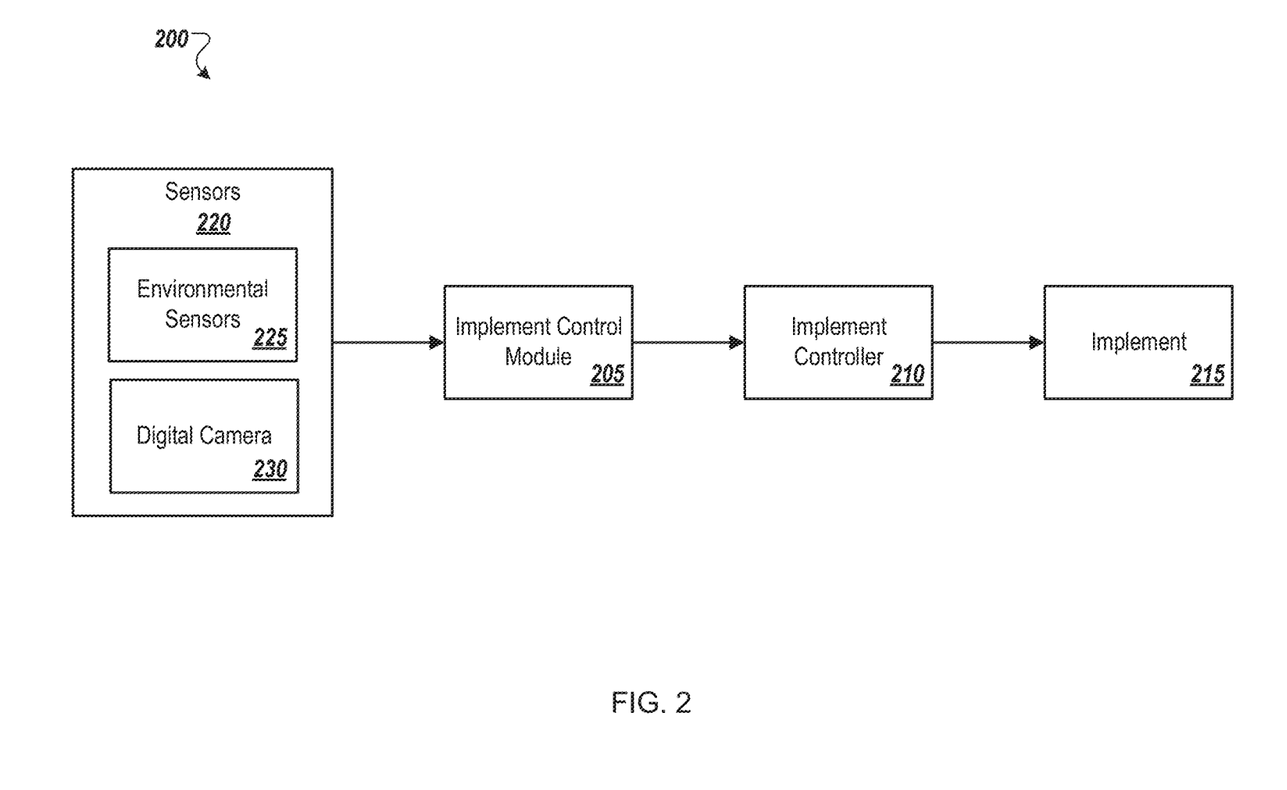
FIG. 2 is a block diagram of an example smart implement control system.

FIG. 2 is a block diagram of an example smart implement control system 200 of a smart implement 100 of FIG. 1, in accordance with at least one embodiment described in the present disclosure. The smart implement control system 200 may include an implement control module 205, implement controller 210, and one or more sensors 220. The one or more sensors 220 may include environmental sensors 225 and a digital camera 230.

The implement control module 205 may include code and routines configured to enable a computing system to perform one or more operations. Additionally or alternatively, the implement control module 205 may be implemented using hardware including a processor, a microprocessor (e.g., to perform or control performance of one or more operations), a field-programmable gate array (FPGA), or an application-specific integrated circuit (ASIC). In some other instances, the implement control module 205 may be implemented using a combination of hardware and software. In the present disclosure, operations described as being performed by the implement control module 205 may include operations that the implement control module 205 may direct a corresponding system to perform. Further, although described separately in the present disclosure to ease explanation of different operations performed and roles, in some embodiments, one or more portions of the implement control module 205 may be combined or part of the same module.

In some embodiments, the implement control module 205 may be configured to interface with the implement 215, such as by the implement controller 210, where the implement 215 may be attached to and/or be powered by a tractor analogously to methods in which other implements attach to and/or are powered by the tractor. For example, the implement 215 may be configured to attach to the tractor via power takeoff (PTO). Alternatively or additionally, the interface between the implement 215 and the tractor may include an electrical connection, and/or any other processes configured to variably transfer power from the tractor to the implement 215. In some embodiments, the implement control module 205 may be configured to determine a varying power request for the implement 215 and may interface with the tractor such that the tractor may provide a variable power delivery. In some embodiments, the implement controller 210 may be configured to provide the controls to the implement 215. The variable power delivery from the implement controller 210 may be in the alternative to and/or in addition to the implement 215 receiving a constant power delivery from the tractor. For example, the amount of power output of the implement 215 may vary based on the amount of power as determined by the implement control module 205 and requested by the implement controller 210, which may be delivered by the tractor.

In some embodiments, the implement controller 210 may be configured to interface with the implement control module 205 and/or the implement 215. For example, the implement controller 210 may be configured to receive input from the implement control module 205 that may be used by the implement controller 210 to cause movement and/or operations of the implement 215. In some embodiments, the implement controller 210 may include one or more motors, actuators, and/or other mechanical devices configured to cause the implement 215 to move. For example, in instances in which the implement control module 205 determines that a sprayer implement may be more effective spraying crops at a further distance from the crops, the implement controller 210 may receive commands from the implement control module 205 and may cause the sprayer implement to retract from the crops and continue to apply a spray.

In some embodiments, the implement control module 205 may provide an output to the implement controller 210 such that the implement 215 may be idled and/or powered down when not in use, including instances in which the implement 215 is connected to a currently operating tractor via PTO. For example, the implement control module 205 may determine to the implement 215 in instances in which the implement 215 may not be used, such as when the tractor makes turns at the end of a row, or transfers from a first location to a second location to continue operations. In some embodiments, the implement control module 205 may receive sensor input from the one or more sensors 220, which may contribute to determining instances in which the implement 215 may be powered down. For example, the digital camera 230 may be configured to detect the tractor is not adjacent to any crops and the implement control module 205 may determine that the implement 215 may be powered down. Alternatively or additionally, the environmental sensors 225 may detect that an amount of work the implement 215 is configured to perform (e.g., mowing weeds) has decreased below a threshold for using the implement 215 and the implement control module 205 may determine that the implement 215 may be powered down. Alternatively or additionally, the tractor may provide an input to the implement control module 205 that the current tractor speed is greater than a threshold for using the implement 215 and the implement control module 205 may determine that the implement 215 may be powered down.

In some embodiments, the implement control module 205 may be configured to receive input from the one or more sensors 220 that may be used to determine a power draw requested by the implement controller 210 and/or the implement 215. For example, the one or more sensors 220 may provide an indication to the implement control module 205 of an amount of force being exerted by the implement 215. For example, in instances in which a mower is the implement 215, the implement control module 205 may determine the mower may benefit from more delivered power based on received input from the one or more sensors 220, which may indicate, based on the amount of force being exerted by the mower, that the mower is currently mowing dense and/or wet grass.

In some embodiments, the implement control module 205 may be configured to vary the speed of the tractor based on the determined power draw of the implement 205. For example, in instances in which a mower is the implement 215 and the mower is currently mowing dense and/or wet grass, the implement control module 205 may provide feedback to the tractor to decrease the tractor speed which may improve the mowing results by the mower. Alternatively or additionally, in instances in which a mower is the implement 215 and the mower is currently mowing light and/or dry grass, the implement control module 205 may provide feedback to the tractor to increase the tractor speed, up to a threshold, which may improve the mowing results by the mower.

In these and other embodiments, the implement control module 205 may be configured to use the requested power draw of the implement controller 210 and/or the implement 215 to manage the power usage of the tractor and/or the implement 215 and/or the speed of the tractor and/or the implement 215. Alternatively or additionally, the implement control module 205 may store the requested power draw over time and may use the stored requested power draw to determine instances in which service to the implement 215 and/or the tractor may contribute to extending the life thereof.

In some embodiments, the implement control module 205 may determine that the implement 215 may be idled and/or powered down may reduce the power consumption of the tractor, which may contribute to a reduced resource drain of the tractor. For example, in instances in which the tractor is an electric vehicle, powering down the implement 215 may result in less drain of the batteries, which may enable the electric tractor to be used for longer periods of time between charges.

In some embodiments, the one or more sensors 220 may be configured to provide sensor input to the implement control module 205 which may be used to direct the tractor to vary the amount of power delivered to the implement 215. In some embodiments, the implement control module 205 may request a variation of power from the tractor based on input and/or data received from the one or more sensors 220. For example, in instances in which the one or more sensors 220 detect an increased workload, the implement control module 205 may request more power from the tractor.

In some embodiments, the implement control module 205 may receive sensor input from the one or more sensors 220. In some embodiments, the one or more sensors 220 may be disposed on the implement 215 and may be configured to detect the operating environment of the implement 215. For example, the one or more sensors 220 that may be coupled to the implement 215 may include a digital camera 230, infrared sensors, radar sensors, lidar sensors, moisture sensors, and/or other environmental sensors 225 which may be disposed on an interior and/or exterior surface of the implement 215. Alternatively or additionally, the one or more sensors 220 may be disposed on the tractor and may be configured to provide sensor input to the implement control module 205. For example, the one or more sensors 220 may be coupled with and/or integrate with the tractor and may capture and send sensor data to the implement control module 205 that may be used to direct operation of the implement 215. Alternatively or additionally, the one or more sensors 220 may be disposed at locations remote from the tractor and/or the implement 215, where the remote sensor input may be communicated to the implement control module 205. For example, the one or more sensors 220 may be disposed throughout the area in which the tractor and/or implement 215 are operating and the remote sensor input may capture and send sensor data to the implement control module 205 that may be used to direct operation of the implement 215.

In instances in which the one or more sensors 220 are disposed on a smart mower, the one or more sensors 220 may detect a density of grass (i.e., plants and/or other objects to be mowed), an amount of binding of cut grass within the implement 215, a moisture level of the grass, and/or other mowing factors. In instances in which the one or more sensors 220 are disposed on a smart sprayer, the one or more sensors 220 may detect a range to the target, an environmental wind speed and direction, a humidity, and/or other spray factors.

In some embodiments, the implement control module 205 may be configured to be in communication with the tractor to which the implement 215 is attached. For example, the implement control module 205 may provide an indication to the tractor of the current workload and/or updates regarding the perceived operating environment of the implement 215. In some embodiments, the implement control module 205 may include software and/or hardware components capable of implementing artificial intelligence (AI) and/or machine learning. Alternatively or additionally, the implement control module 205 may transmit sensor data from the one or more sensors 220 to the tractor and/or a remote system which tractor and/or remote system may include the software and/or hardware components capable of implementing artificial intelligence and/or machine learning.

In some embodiments, the AI and/or machine learning system may be integrated with the implement control module 205, such that the implement control module 205 may perform some or all of the functions of the AI and/or machine learning system. Alternatively or additionally, the AI and/or machine learning may be separate and/or distinct from the implement control module 205 and may be configured to communicate with the implement control module 205. For example, in instances in which the AI and/or machine learning is separate from the implement control module 205, the operation of the AI and/or machine learning system may be performed by a computing system, such as the computing system 402 of FIG. 4.

In some embodiments, the implement control module 205 may aggregate data from the one or more sensors 220 to improve the response time of the operation of the implement 215 to the detected environment and/or predict a response based on the detected environment. For example, the implement control module 205 may use positional data and/or sensor data from the one or more sensors 220 to determine that a section of a tract of land grows grass at a faster rate and may request the tractor increase power delivered to the implement 215, such as a mower, when the tractor enters the section. Alternatively or additionally, the implement control module 205 may use time data and/or sensor data to determine that mowing at certain times of the day may result in wetter grass (e.g., mowing in the morning with dew present), and may send a request to the tractor to increase power to the implement 215 at early times and/or reduce power as the day advances.

In some embodiments, the implement control module 205 may be configured to measure and record a run time and/or an operational time of the implement 215. For example, the implement control module 205 may record an amount of time the implement 215 is powered on (i.e., the run time) and/or an amount of time the implement 215 is performing a task (i.e., the operational time). Alternatively or additionally, the implement control module 205 may be configured to determine an intensity level of the conditions the implement 215 is operating under, such as based on data from the one or more sensors 220. For example, in instance in which a mower is the implement 215, sensor data obtained by the implement control module 205 may indicate a height, a density, a moisture level, and/or other characteristics of grass to be mowed, such that the implement control module 205 may determine an intensity level related to the operation of the implement 215. In some embodiments, the intensity level may include a metric that may be calculated by the implement control module 205, such as a weighted score and/or combination of various metrics related to the intensity of operation of the implement 215.

In these and other embodiments, the implement control module 205 may be configured to use the data associated with the run time, the operational time, and/or the intensity level of the conditions, to determine a maintenance schedule for the implement 215. For example, the implement control module 205 may determine a usage metric by summing a run time metric, an operational time metric, and an intensity level metric and compare it to a threshold. When the usage metric exceeds the threshold, the implement control module 205 may determine the implement 215 may be benefitted from maintenance. In some embodiments, the implement control module 205 may be configured to provide the maintenance data to an operator of the implement. For example, in instances in which the implement control module 205 has determined the usage metric exceeds the threshold, the implement control module 205 may be configured to provide a visual indication, an aural indication, a tactile indication, and/or may provide a transmitted message to the operator, such as described below.

In some embodiments, the implement control module 205 may be configured to wirelessly communicate with other devices. For example, the implement control module 205 may be configured to communicate via wireless channels including Wi-Fi, WiMAX, Bluetooth®, cellular communications, and/or other wireless technologies. In some embodiments, the implement control module 205 may wirelessly communicate with the tractor and/or an operator's mobile device. A mobile device may include a mobile phone, tablet, personal computer, and/or other mobile devices. In some embodiments, the wireless communication from the implement control module 205 to a mobile device may be via mobile application that may include a graphical user interface for displaying received data (e.g. sensor data) and transmitted control data (e.g., control instructions in the implement controller 210) related to the implement control module 205, and/or operational information of the implement 215. In some embodiments, the implement control module 205 may wirelessly transmit sensor data and/or operational data to the mobile device. For example, the implement control module 205 may transmit a current RPM, a recommended implement RPM, a percentage representing the current RPM as a percentage of maximum RPM, a recommended tractor speed, a recommended time until next implement service, total operational hours, and/or other operational data of the implement 215.

In some embodiments, the implement control module 205 may be configured to receive wireless communications from the mobile device which may be used with the implement control module 205 to provide controls to the implement controller 210 that may control the implement 215. For example, the mobile device may transmit a maximum RPM, a recommended tractor speed, and/or other commands to the implement control module 205. Alternatively or additionally, the mobile device may transmit wireless communications to the tractor, which may, in turn, interface with the implement control module 205. In these and other embodiments, the operator may input commands into the mobile application which may wirelessly transfer the data to either directly to the implement control module 205 and/or indirectly to the implement control module 205, such as via the tractor.

In some embodiments, the tractor may respond to received data from the implement control module 205 which may improve efficiency and/or operations. For example, in response to receiving data from the implement control module 205 that the implement 215 is underused, the tractor may increase the tractor speed and/or decrease the power delivered to the implement 215.

In some embodiments, the implement control module 205 may be used in conjunction with existing implements that may not include one or more sensors, but that may be outfitted with the one or more sensors 220 as described above. For example, the implement control module 205 may be used in conjunction with a mower, a weeder, a sprayer, a seeder, and/or other similar attachable implements for use with tractors. Alternatively or additionally, the implement control module 205 may be integrated with implements 215 that include the one or more sensors 220. For example, an implement such as a smart mower may include the one or more sensors 220 which may include the environmental sensors 225 and/or the digital camera 230 that may provide sensor data to the implement control module 205.

In some embodiments, the implement control module 205 may receive a default tractor speed for operation based on the implement 215 in use, which speed may be transmitted to the tractor. For example, the implement control module 205 may determine a smart mower's default speed be slower than a smart sprayer's default speed. Alternatively or additionally, the default speed, as determined by the implement control module 205, may be set and/or adjusted based on data received by the implement control module 205 from previous operations. For example, in instances in which the one or more sensors 220 associated with a smart mower repeatedly provides data to the implement control module 205 that slows down the tractor, the implement control module 205 may determine that the default speed for the smart mower may be reduced.

In some embodiments, the implement control module 205 may be implemented with an existing agricultural vehicle, such as a tractor, which may be outfitted to include additional sensors and/or hardware to communicate with the implement control module 205. Alternatively or additionally, the implement control module 205 may be integrated with a future agricultural vehicle, such as an autonomous land drone as described in U.S. Provisional Patent Application Ser. No. 63/136,197.

Figure 3:
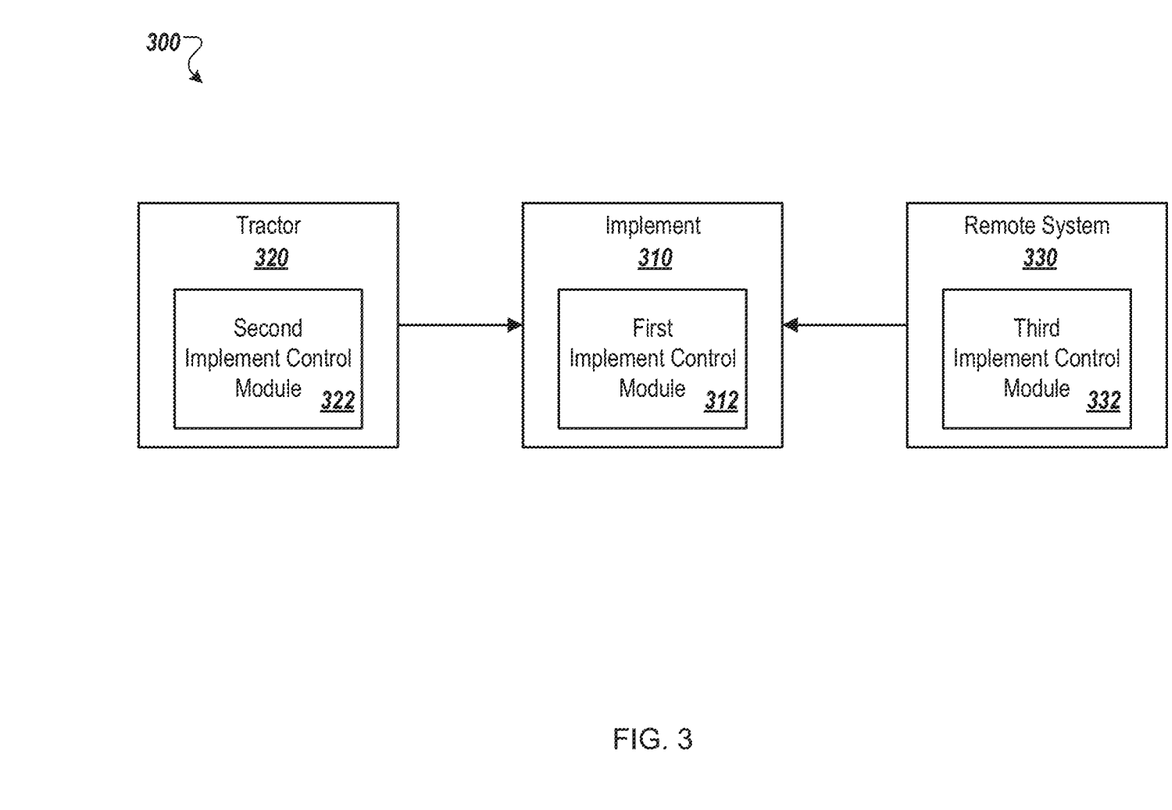
FIG. 3 is a block diagram of an example system for controlling an implement.

FIG. 3 is a block diagram of an example system 300 for controlling an implement, in accordance with at least one embodiment described in the present disclosure. The system 300 may include an implement 310, a tractor 320, and a remote system 330. The implement 310 may include a first implement control module 312, the tractor 320 may include a second implement control module 322, and the remote system 330 may include a third implement control module 332.

In some embodiments, the first implement control module 312 may be disposed on or in the implement 310, the second implement control module 322 may be disposed on or in the tractor 320, and the third implement control module 332 may be disposed on or in the remote system 330. The implement 310 may be analogous to the implement 215 of FIG. 2.

In some embodiments, the first implement control module 312 may be configured to direct operation of the implement 310. For example, the first implement control module 312 may receive sensor input and/or may determine operational control of the implement 310. Alternatively or additionally, the first implement control module 312, the second implement control module 322, and the third implement control module 332 may be configured to interface with each other to direct operation of the implement 310. For example, receiving sensor input, analyzing the sensor data and tractor operations, and providing the control operations for the implement 310 may be distributed and performed by combinations of the three implement control modules. Alternatively or additionally, one of the first implement control module 312, the second implement control module 322, and the third implement control module 332 may perform some or all the operations for operating the implement 310. For example, in some embodiments, only the second implement control module 322 or the third implement control module 332 may be present to direct operation of the implement 310. Alternatively or additionally, other various combinations of the three implement control modules may be used to direct operation of the implement 310.

Figure 4:
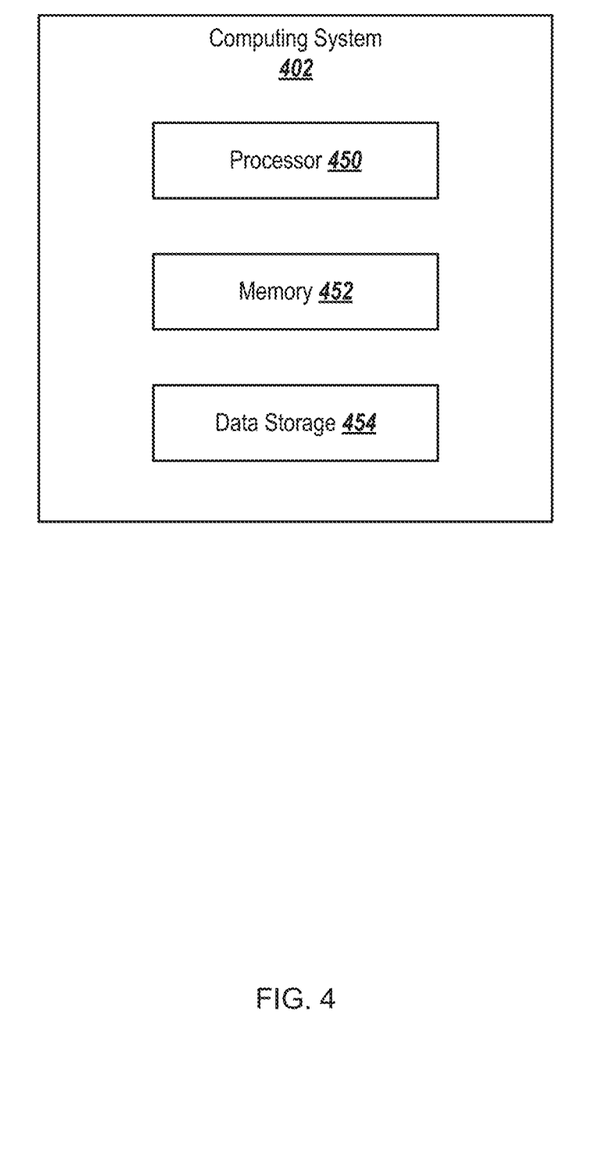
FIG. 4 illustrates a block diagram of an example computing system.

FIG. 4 illustrates a block diagram of an example computing system 402, according to at least one embodiment of the present disclosure. The computing system 402 may be configured to implement or direct one or more operations associated with an implement control module (e.g., the implement control module 205 of FIG. 2). The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

For example, in some embodiments, an implement control module may be included in the data storage 454 as program instructions. The processor 450 may fetch the program instructions of a corresponding module from the data storage 454 and may load the program instructions of the corresponding module in the memory 452. After the program instructions of the corresponding module are loaded into memory 452, the processor 450 may execute the program instructions such that the computing system may implement the operations associated with the corresponding module as directed by the instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Figure 5:
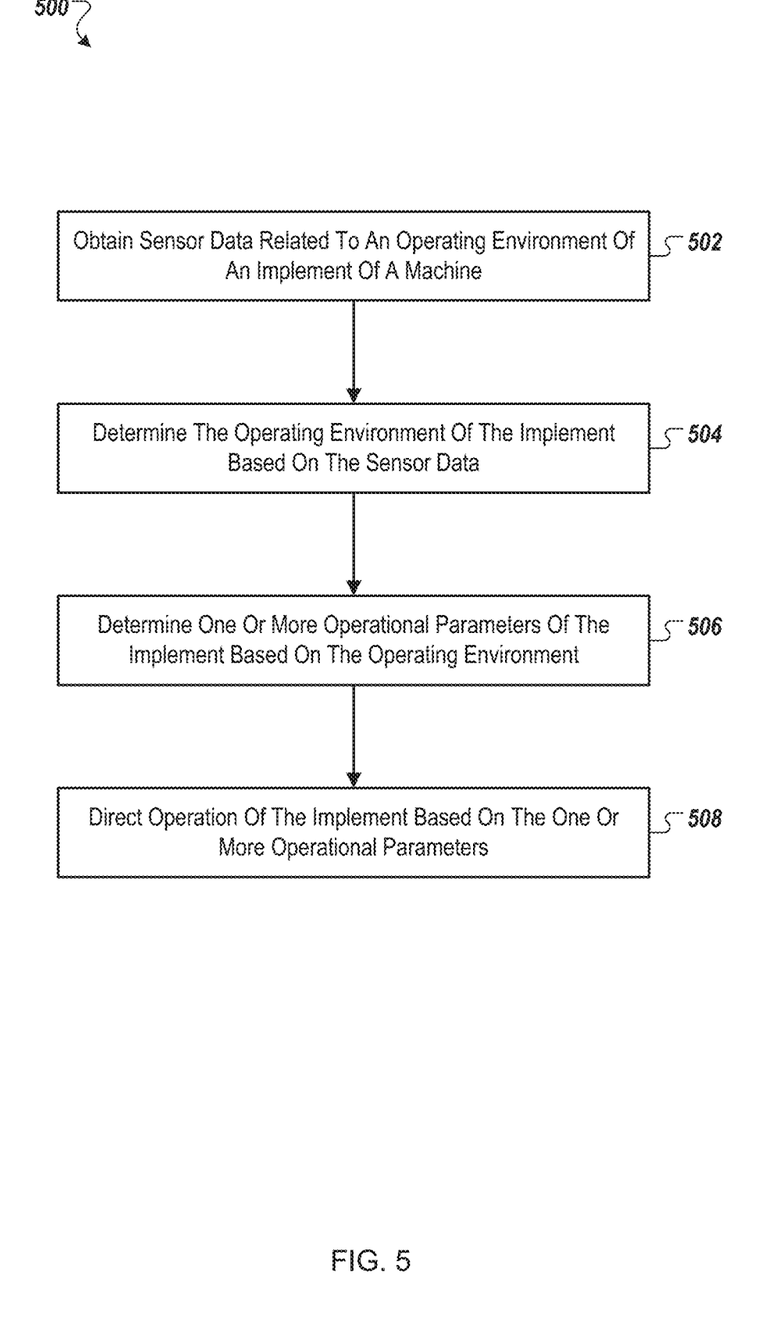
FIG. 5 illustrates an example flowchart of an example method of controlling an implement, all arranged in accordance with at least one embodiment of the present disclosure.

FIG. 5 illustrates an example flowchart of an example method 500 of controlling an implement, described according to at least one embodiment of the present disclosure. The method 500 may be performed by any suitable system, apparatus, or device. For example, one or more of the operations of the method 500 may be performed by an implement control module, an implement controller, and/or a computing system, such as those described above. Further, the implement 215 or the implement 310 described above may be examples of the implement that may be controlled.

At block 502, sensor data may be obtained. For example, in some embodiments, sensor data such as that described above with respect to the sensors 220 of FIG. 2 may be obtained.

At block 504, an operating environment of an implement may be determined. In some embodiments, conditions about the environment such as those described above with respect to FIG. 2 may be determined based on the sensor data and may be examples of the different operating environments that may be encountered by the implement.

At block 506, one or more operational parameters of the implement may be determined. The operational parameters may include any parameters that may affect operation of the implement, such as amount of power to provide to the implement, when to engage the implement (e.g., power up), when to disengage the implement (e.g., power down), adjustment of speed of a tractor or other machine using the implement, etc. In some embodiments, the examples of such parameters given with respect to FIG. 2 may be example operational parameters At block 508, operation of the implement may be directed based on the determined operational parameters. For example, the tractor or other machine may be directed to provide a certain amount of power to the implement, operate at a certain speed, etc., according to the determined operational parameters.

Modifications, additions, or omissions may be made to the method 500 without departing from the scope of the present disclosure. For example, the order of one or more of the operations described may vary than the order in which they were described or are illustrated. Further, each operation may include more or fewer operations than those described. For example, any number of the operations and concepts described above with respect to FIG. 2 may be included in or incorporated by the method 500. In addition, the delineation of the operations and elements is meant for explanatory purposes and is not meant to be limiting with respect to actual implementations.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B." All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, the scope of the invention is intended to be defined only by the claims which follow.

What is claimed is:

1. An agricultural implement system, comprising:
an electrically powered implement configured to perform an agricultural function;
a connector configured to removably couple the implement to an electric vehicle and configured to provide electrical power to the implement from one or more batteries of the electric vehicle by directing the electrical power to the implement, the implement obtaining the electrical power and using the electrical power to perform the agricultural function by powering an mechanical operation with the electrical power obtained from the electric vehicle;
one or more computer readable mediums configured to store instructions; and
one or more computing devices coupled to the computer readable mediums and the implement and configured to execute the instructions to cause the implement system to perform operations, the operations comprising:
obtaining first data at an agricultural implement removably coupled to the vehicle;
in response to the first data, determining, by the agricultural implement, to extend usage of the one or more batteries of the electric vehicle before recharging of the one or more batteries;
in response to determining to extend usage of the one or more batteries, determining to reduce electrical power consumption of the agricultural implement;
automatically adjust performance of a mechanical operation executed by the agricultural implement in response to the change in the electrical power consumption of the agricultural implement;
generate, at the agricultural implement, second data based on the change to the electrical power consumption of the agricultural implement; and
direct, from the agricultural implement, the second data to the vehicle, the vehicle configured to automatically adjust an operation of the vehicle based on the second data.

2. The implement system of claim 1, wherein the first data includes information from one or more sensors regarding an environment surrounding the implement.

3. The implement system of claim 1, wherein the operation of the vehicle includes one or more of: positioning of the vehicle, a speed of the vehicle, and an amount of power delivered to the implement.

4. The implement system of claim 1, wherein the vehicle is an electric vehicle that is only powered via the one or more batteries.

5. The implement system of claim 4, wherein the operations further comprise detecting, using the first data, whether an amount of work the implement is configured to perform satisfies a threshold, wherein the determining to extend usage of the one or more batteries occurs in response to the threshold being satisfied.

6. The implement system of claim 5, wherein the operations further comprise:
before obtaining the first data, setting the operation of the electric vehicle at a first default setting in response to the implement being removably coupled to the electric vehicle; and
in response to adjusting an operation of the electric vehicle based on the second data, adjusting the first default setting based on the second data such that the operation of the electric vehicle, in the future in response to the implement being removably coupled to the electric vehicle, operates using the adjusted first default setting.

7. The implement system of claim 6, wherein the operations further comprising:
monitoring electrical power consumption of the implement; and
determining, based on the monitoring electrical power consumption, when to service the implement.

8. One or more non-transitory computer readable mediums configured to store instructions that when executed perform operations, the operations comprising:
obtaining first data at an electrically powered agricultural implement removably coupled to an electric vehicle that is only powered via one or more batteries, the electric vehicle configured to provide electrical power to the implement from the one or more batteries by directing the electrical power to the implement, the implement obtaining the electrical power and using the electrical power to perform an agricultural function by powering an mechanical operation with the electrical power obtained from the electric vehicle;
detecting, using the first data, whether an amount of work the agricultural implement is configured to perform satisfies a threshold;
in response to the threshold being satisfied, determining how to change electrical power consumption of the agricultural implement;
automatically adjusting performance of a mechanical operation executed by the agricultural implement in response to the change in the electrical power consumption of the agricultural implement;
generating second data based on the change to the electrical power consumption of the agricultural implement;

directing the second data to the vehicle, the electric vehicle configured to automatically adjust an operation of the electric vehicle based on the second data;

after adjusting operation of the electric vehicle, determining to extend usage of the one or more batteries of the electric vehicle by reducing electrical power consumption of the agricultural implement; and in response to determining to extend usage of the one or more batteries, reducing electrical power consumption of the agricultural implement by adjusting performance of a mechanical operation executed by the agricultural implement.

9. The one or more non-transitory computer readable mediums of claim 8, wherein the first data includes information from one or more sensors regarding an environment surrounding the implement.

10. The one or more non-transitory computer readable mediums of claim 8, wherein the operation of the electric vehicle includes one or more of:

positioning of the electric vehicle, a speed of the electric vehicle, and an amount of power delivered to the implement.

11. The one or more non-transitory computer readable mediums of claim 8, wherein the second data is generated by the agricultural implement.

12. The one or more non-transitory computer readable mediums of claim 8, wherein the operations further comprise:

before obtaining the first data, setting the operation of the electric vehicle at a first default setting in response to the agricultural implement being removably coupled to the electric vehicle; and in response to adjusting an operation of the electric vehicle based on the second data, adjusting the first default setting based on the second data such that the operation of the electric vehicle, in the future in response to the agricultural implement being removably coupled to the electric vehicle, operates using the adjusted first default setting.

13. The one or more non-transitory computer readable mediums of claim 12, wherein the operations further comprising:

monitoring electrical power consumption of the agricultural implement; and determining, based on the monitoring electrical power consumption, when to service the agricultural implement.

14. An agricultural vehicle comprising:

a connector system configured to removably couple the vehicle to anyone of a plurality of different types of electrically powered agricultural implements each configured to perform a different agricultural function;

one or more batteries configured to provide the only power to the vehicle and the only electrical power to the plurality of different types of electrically powered agricultural implements via the connector system by the connector system directing the electrical power to the agricultural implements, the agricultural implements obtaining the electrical power and using the electrical power to perform the agricultural functions by powering mechanical operations with the electrical power obtained from the electric vehicle;

one or more computer readable mediums configured to store instructions; and one or more computing devices coupled to the computer readable mediums and configured to execute the instructions to cause the vehicle to perform operations, the operations comprising:

obtain data from the coupled agricultural implement, the data based on a change to electrical power consumption of a coupled agricultural implement;

adjust an operation of the vehicle based on the data; and in response to a determination to extend usage of the one or more batteries of the vehicle before recharging of the one or more batteries, reducing electrical power provided to the agricultural implement.

15. The agricultural vehicle of claim 14, wherein the operation of the vehicle includes one or more of: positioning of the vehicle, a speed of the vehicle, and an amount of power delivered to the implement.

16. The agricultural vehicle of claim 14, wherein the operations further comprise:

before obtaining the data, set the operation of the vehicle at a first default setting in response to the agricultural implement being removably coupled to the vehicle; and in response to adjusting an operation of the vehicle based on the data, adjust the first default setting based on the data such that the operation of the vehicle in the future, in response to the agricultural implement being removably coupled to the vehicle, operates using the adjusted first default setting.

17. The agricultural vehicle of claim 16, wherein the operations further comprising:

monitoring electrical power consumption of the agricultural implement; and determining, based on the monitoring electrical power consumption, when to service the agricultural implement.

18. The agricultural vehicle of claim 14, further comprising one or more sensors configured to generate second data regarding an environment surrounding the vehicle, wherein the operations comprise direct the second data to the coupled agricultural implement, wherein the change to the electrical power consumption of the agricultural implement is determined based on the second data.

19. The agricultural vehicle of claim 14, wherein the data includes instructions that direct the vehicle to adjust the operation of the vehicle.

20. The agricultural vehicle of claim 14, wherein the vehicle is an autonomous electric tractor.

* * * * *